United States Patent [19]

Hackworth et al.

[11] Patent Number: 4,739,442

[45] Date of Patent: Apr. 19, 1988

[54] HIGH CURRENT MECHANICAL CONNECT/DISCONNECT SWITCH

[75] Inventors: Donald T. Hackworth, Monroeville; Jiing-Liang Wu, Murrysville; David Marschik, Wilkins Township, Allegheny County, all of Pa.

[73] Assignee: Westinghouse Electric Corp., Pittsburgh, Pa.

[21] Appl. No.: 943,015

[22] Filed: Dec. 18, 1986

[51] Int. Cl.[4] .............................................. H02B 1/00

[52] U.S. Cl. .................................. 361/379; 361/381; 361/386; 200/16 B; 200/16 E

[58] Field of Search .............. 361/379, 385; 200/16 E, 200/16 B, 162, 163

[56] References Cited

U.S. PATENT DOCUMENTS 3,800,103 3/1974 Hardi-Kern et al. ............ 200/16 E 3,941,957 3/1976 Tilman ............................ 200/16 B

*Primary Examiner*—Robert S. Macon

*Attorney, Agent, or Firm*—D. Schron

[57] ABSTRACT

A connect/disconnect switch which is partially immersed in a cryogenic coolant includes colinearly arranged electrically conducting hollow cylinders separated by an electrically insulating as well as thermally insulating support member. An electrically conducting plug member is moveable within the cylinders with the cylinders being electrically connected to bus bars. During current flow operation, an electrical path is established between the hollow cylinders by means of the moveable plug whereas when a disconnect is desired, the moveable plug is removed from contacts with at least one of the cylinders thereby breaking the electrical as well as thermal path.

9 Claims, 4 Drawing Sheets

HIGH CURRENT MECHANICAL CONNECT/DISCONNECT SWITCH

STATEMENT OF GOVERNMENT INTEREST

The Government has rights in this invention pursuant to Contract FO8635-840-C-0331 with the Department of Defense.

BACKGROUND OF THE INVENTION

1. Field of the Invention

The invention in general relates to electrical switches, and more particularly to one which is used in a cryogenic environment to accomplish both electrical and thermal disconnects.

2. Description of the Prior Art

Various electrical systems or components require operation at cryogenic temperatures. For example, in electromagnetic launcher apparatus, hundreds of thousands to millions of amperes are provided to a parallel rail arrangement for propelling a projectile along the rails to a desired velocity. One common type of power supply to deliver these currents utilizes a homopolar generator which charges an inductor to a certain firing level whereupon the current stored in the inductor is commutated into the rails.

In order to be able to accommodate megamp currents, the inductor is quite massive and is operated at cryogenic temperatures to significantly reduce the resistance of the inductor coils so as to increase the inductance-to-resistance ratio.

With the inductor connected in circuit during non-operating conditions, thermal heat leaks through the electrical connections require a continual replacement of the cryogenic coolant which is utilized. Accordingly, a need exists for a connect/disconnect switch capable of carrying megamp currents during operation of the inductor while providing thermal isolation when the inductor is disconnected from the remainder of the apparatus.

SUMMARY OF THE INVENTION

The switch of the present invention meets the requirements of high current capability with thermal isolation and includes first and second electrically conducting hollow cylinders colinearly arranged along a central longitudinal axis. An electrically insulating support member is provided to support and maintain the first and second cylinders in spaced apart relationship, and, for cryogenic operation, is of a material which has a low thermal conductance. A movable electrically conducting plug member is slidable within the cylinders and includes on the outer surface thereof first and second spring biased electrically conducting spaced apart sections arranged in circumferential bands around the plug member. First and second bus bars are respectively connected to the first and second cylinders and means are provided for moving the plug member from a first position wherein the first and second spring biased electrically conducting sections respectively contact the inner surfaces of the first and second cylinders, and a withdrawn position wherein the contact is broken with at least one of the cylinders. When the conductor is removed from the electrical circuit, and the plug member is in the withdrawn position, a thermal heat path which is normally provided along the conducting members is interrupted by the insulating support member to minimize thermal leakage.

DESCRIPTION OF THE PREFERRED EMBODIMENT

Figure 1:
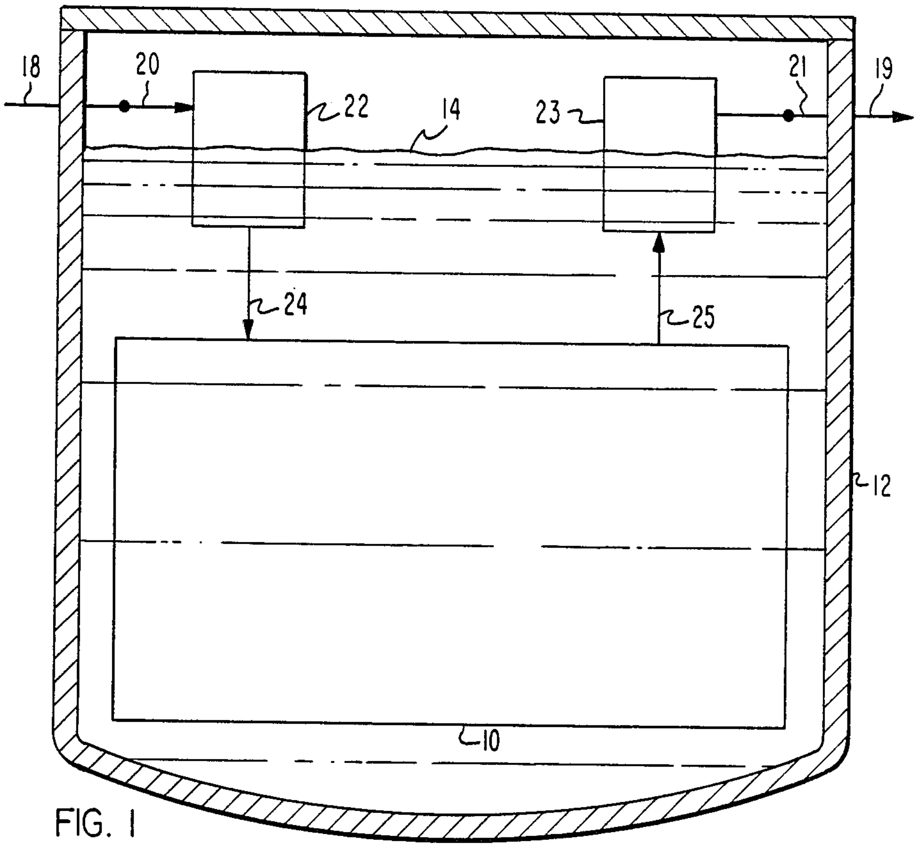
FIG. 1 illustrates a cryogenically-operated inductor environment in which the switch of the present invention may be utilized.
Figure 2:
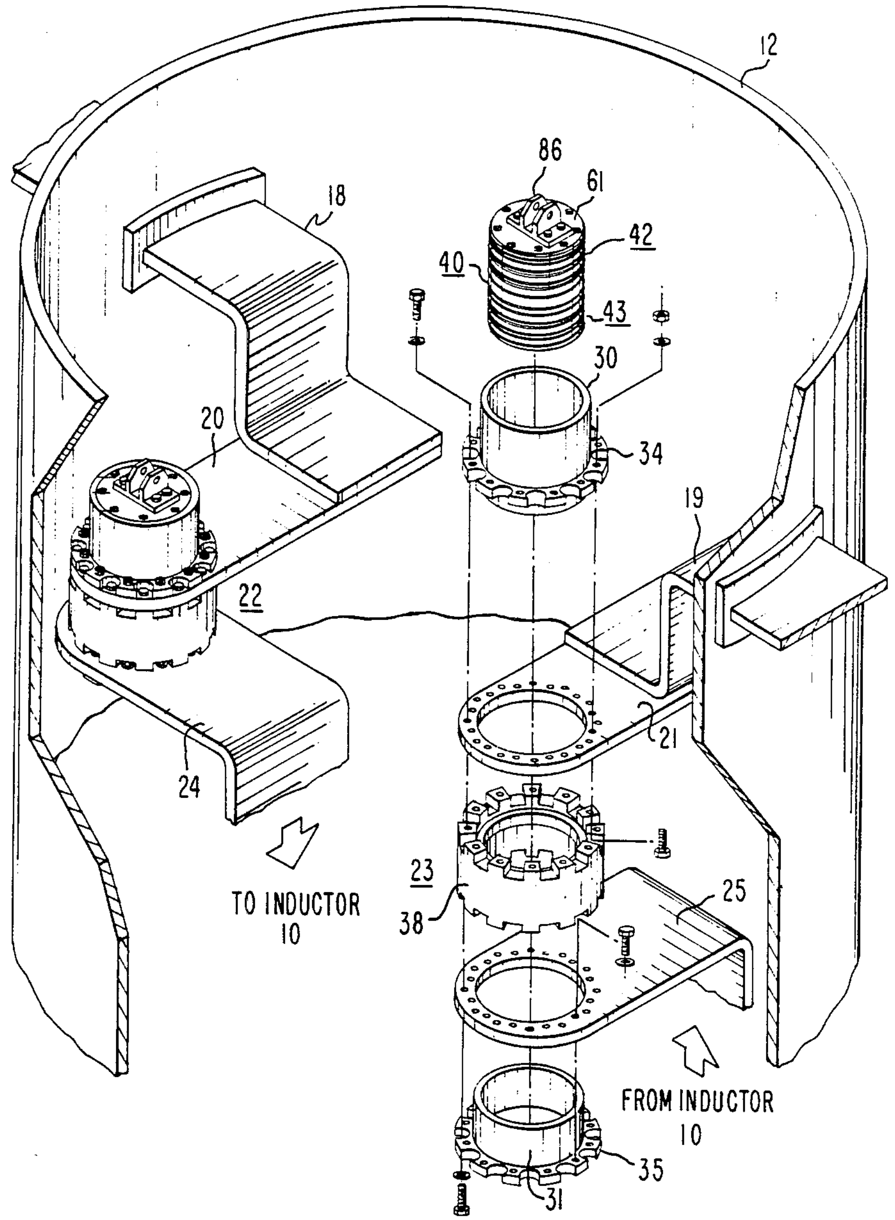
FIG. 2 is a more detailed view of the switch means illustrated in FIG. 1, with one of the switches being illustrated in an exploded view.

In FIG. 1, inductor 10, capable of handling megamp currents, is operated at cryogenic temperatures and accordingly is illustrated as being contained within a cryostat 12 filled with a cryogenic coolant such as liquid nitrogen 14. Input and output leads 18 and 19 make electrical connection with the inductor 10 by means of respective bus bars 20 and 21, connect/disconnect switches 22 and 23, and bus bars 24 and 25. A further view of the switch arrangement is illustrated in FIG. 2 wherein one of the switches, switch 23 is illustrated in an exploded view.

In view of the high current-carrying capacity of the inductor and switches, the input and output leads as well as the bus bars are fabricated of relatively thick copper plate. Examining switch 23 as exemplary, the switch includes upper and lower electrically conducting hollow cylinders 30 and 31 each including a respective flange portion 34 and 35. These flanges accommodate bolts for making electrical connection with respective bus bars 21 and 25 as well as for making a mechanical connection with a central electrically-insulating support member 38 of generally hollow cylindrical form. A movable electrically conducting plug member 40 includes upper and lower sections of spring biased contacts 42 and 43 and is arranged to move within the hollow cylinders. An assembled cross-sectional view is further illustrated in FIG. 3.

Electrically insulating support member 38 includes an internal ledge 50 having top and bottom surfaces 51 and 52 which respectively abut the bottom of the upper cylinder 30 and the top of the lower cylinder 31, the arrangement forming a smooth internal bore to accommodate movement of the plug member 40 along a longitudinal central axis C.

Figure 4:
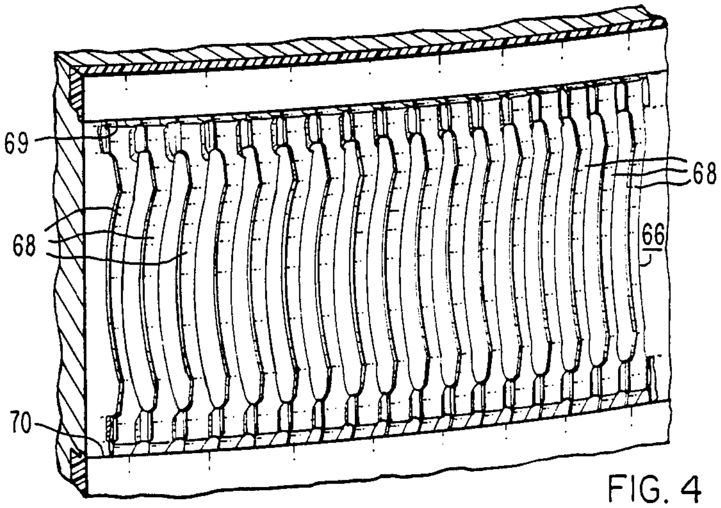
FIG. 4 is a view of one type of contact which may be utilized in the switch of FIG. 3.

Plug member 40 includes an electrically conducting hollow cylinder 60 to which is connected electrically insulating top and bottom members 61 and 62. The upper conducting section 42 as well as the lower conducting section 43 includes a plurality of bands 66 of spring biased contacts. As further illustrated in FIG. 4, a typical band 66 includes a plurality of parallel louvers extending between edges 69 and 70. The louvers are of beryllium copper and when placed against a member such as upper or lower cylinder 30 or 31 will deflect somewhat while being forced into intimate contact with the cylinder surface and when conducting high pulse power, the resulting electromagnetic field increases contact pressure. Such contacts are commercially available items such as from Hugin Industries, Inc. of Los Altos, Calif.

Referring back to FIG. 3, the bands 66 are separated and held in place by a plurality of insulating bands 74 through 80 on the outer surface of cylinder 60, contact being made with the respective edges 69 and 70 of the contacts.

During operation when conducting current, current flow is from the lower bus bar 25 through lower cylinder 31 through the lower bands 66 into conducting cylinder 60, out through the upper bands 66 through upper cylinder 30 and out bus bar 21. The current conduction path is made up of copper conductors which also are thermal conductors. The liquid level of the cryogenic coolant is as indicated by the dotted line and it is seen that some of the current-carrying members are immersed in the coolant while others are above it. When the inductor is in a non-operating condition, a heat leakage path is established from outside the cryostat to the members submerged in the cryogenic coolant by means of the current path. The resultant heating of the cryogenic coolant causes a loss of the coolant which therefore must be replaced periodically. With the present invention, however, support member 38 is fabricated of a material which not only is an electrical insulation but is also a thermal insulation to minimize any heat transfer, one example of which is an epoxy-glass fiber laminate.

Figure 3:
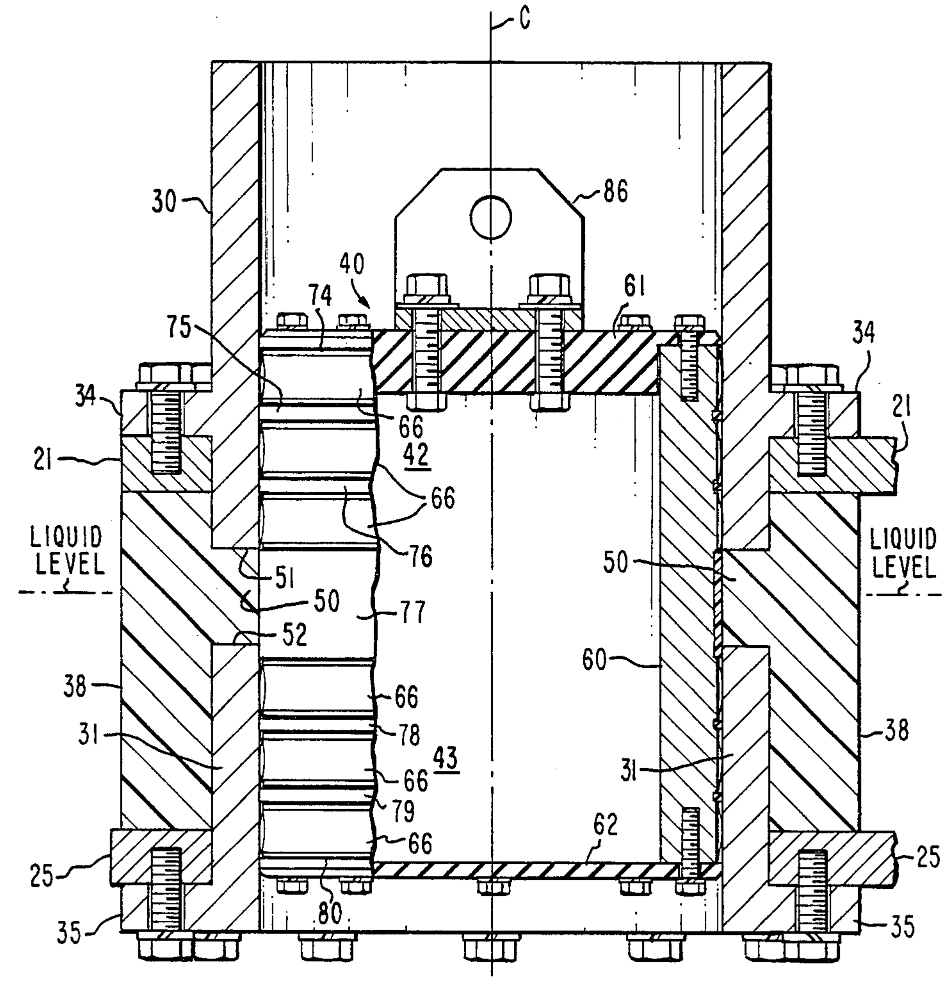
FIG. 3 is a sectional view of a typical switch in accordance with the present invention.
Figure 5:
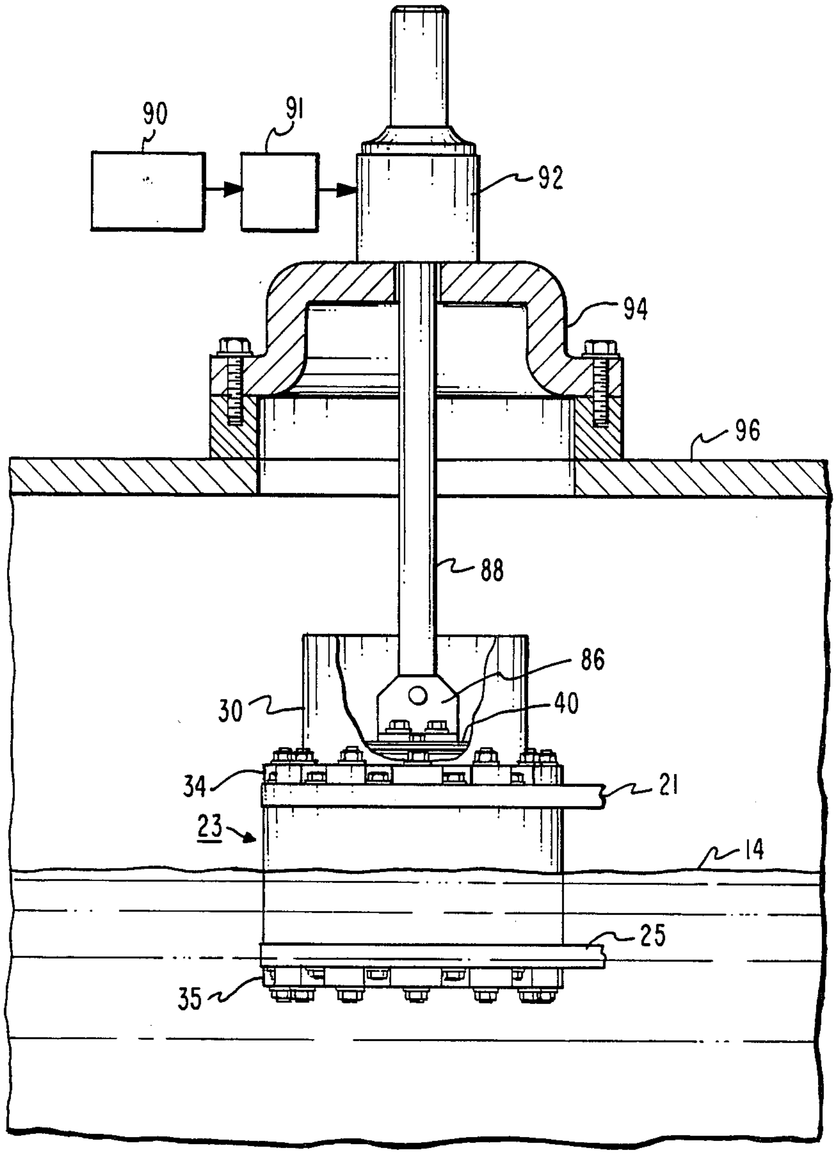
FIG. 5 illustrates an actuator mechanism for the switch.

During non-operating periods of the inductor, plug 40 is removed from the position illustrated in FIG. 3 to a withdrawn position whereby electrical and thermal contact is broken with the lower cylinder 31 thereby eliminating a continuous thermal heat path. For this purpose, the top 61 of plug 40 is provided with a clevis 86 to which is connected an actuator rod 88 as illustrated in FIG. 5. A motor 90 connected through gear box 91 is operable to drive actuator 92 to raise and lower the plug 40. The actuator sits on a mounting 94 which is connected to the top 96 of the cryostat.

Although switch 23 has been described in detail, it is to be understood that the other connect/disconnect switch 22 would be of identical construction and operation.

We claim:

1. An electrical connect/disconnect switch comprising:

(A) a first electrically conducting hollow cylinder;
(B) a second electrically conducting hollow cylinder;
(C) said first and second cylinders being colinearly arranged along a central longitudinal axis;
(D) an electrically insulating support member connected to support and maintain said first and second cylinders in spaced apart relationship;
(E) a moveable electrically conducting plug member slideable within said cylinders and including on the outer surface thereof first and second spring biased electrically conducting spaced apart sections;
(F) a first bus bar connected to said first cylinder;
(G) a second bus bar connected to said second cylinder;
(H) means for moving said plug member from a first position wherein said first and second spring biased electrically conducting sections respectively contact the inner surfaces of said first and second cylinders, and a withdrawn position wherein contact is broken with at least one of said cylinders;
(I) said plug, when in said first position, completing electrical contact from said first bus bar to said second bus bar through said first cylinder, said plug and said second cylinder;
(J) said moveable plug member being of a hollow cylindrical shape having first and second end covers;
(K) a clevis connected to said first end cover; and
(L) said means for moving being connected to said clevis.

2. Apparatus according to claim 1 wherein:
(A) said support member is of a generally hollow cylindrical shape arranged about said central longitudinal axis.

3. Apparatus according to claim 2 wherein:
(A) said support member includes an internal ledge;
(B) one end of said first electrically conducting cylinder abutting the top surface of said ledge;
(C) one end of said second electrically conducting cylinder abutting the bottom surface of said ledge;

4. Apparatus according to claim 3 which includes:
(A) a first electrically conducting flange member connected to said first cylinder;
(B) a second electrically conducting flange member connected to said second cylinder.

5. Apparatus according to claim 4 wherein:
(A) said first flange member is connected to said first bus bar;
(B) said first bus bar is connected to one end of said support member;
(C) said second flange member is connected to said second bus bar;
(D) said second bus bar is connected to the other end of said support member.

6. Apparatus according to claim 1 wherein:
(A) each said spring biased section of said plug member includes a plurality of circumferential bands of spring biased contacts.

7. Apparatus according to claim 6 which includes:
(A) a plurality of circumferential bands of electrically insulating material contacting and holding said bands of spring biased contacts in position.

8. Apparatus according to claim 1 wherein:
(A) said switch is operated in a cryogenic coolant environment within a cryostat wherein the coolant liquid level is maintained between said first and second bus bars;
(B) said support member being of a material to thermally isolate said first and second electrically conducting cylinders.

9. Apparatus according to claim 8 which includes:
(A) an inductor immersed in said coolant, and including an input lead and an output lead;
(B) one of said switches being connected to said input lead;
(C) another one of said switches being connected to said output lead to thermally decouple said inductor from the surrounding ambient medium outside of said cryostat.

* * * * *